(12) United States Patent
Kobayashi

(10) Patent No.: US 11,543,183 B2
(45) Date of Patent: Jan. 3, 2023

(54) FLUE GAS RECYCLE METHOD FOR THERMOCHEMICAL REGENERATION

(71) Applicant: Hisashi Kobayashi, Bedford, NY (US)

(72) Inventor: Hisashi Kobayashi, Bedford, NY (US)

(73) Assignee: Praxair Technology, Inc., Danbury, CT (US)

( * ) Notice: Subject to any disclaimer, the term of this patent is extended or adjusted under 35 U.S.C. 154(b) by 445 days.

(21) Appl. No.: 16/585,378

(22) Filed: Sep. 27, 2019

(65) Prior Publication Data

US 2020/0116429 A1 Apr. 16, 2020

Related U.S. Application Data

(60) Provisional application No. 62/746,324, filed on Oct. 16, 2018.

(51) Int. Cl.
| | |
|---|---|
| *F27D 17/00* | (2006.01) |
| *F27B 3/26* | (2006.01) |
| *C03B 5/237* | (2006.01) |
| *C01B 3/34* | (2006.01) |

(52) U.S. Cl.
CPC ............ *F27B 3/266* (2013.01); *C01B 3/34* (2013.01); *C03B 5/237* (2013.01); *F27D 17/004* (2013.01); *C01B 2203/1241* (2013.01); *C01B 2203/148* (2013.01); *F27D 2017/007* (2013.01)

(58) Field of Classification Search
None
See application file for complete search history.

(56) References Cited

U.S. PATENT DOCUMENTS

| | | | | |
|---|---|---|---|---|
| 6,113,874 A | * | 9/2000 | Kobayashi | ............... C01B 3/34 585/653 |
| 6,383,461 B1 | | 5/2002 | Lang | |
| 6,383,462 B1 | | 5/2002 | Lang | |
| 10,184,659 B2 | * | 1/2019 | Wu | ........................ F23J 15/06 |
| 2004/0057898 A1 | | 3/2004 | Singh et al. | |
| 2010/0252776 A1 | | 10/2010 | Farmayan et al. | |

(Continued)

FOREIGN PATENT DOCUMENTS

| | | |
|---|---|---|
| WO | 2017112671 A1 | 6/2017 |
| WO | 2018013455 A1 | 1/2018 |

OTHER PUBLICATIONS

Inspection for Industry LLC (Year: 2017).*

(Continued)

*Primary Examiner* — Steven S Anderson, II
*Assistant Examiner* — Kurt J Wolford
(74) *Attorney, Agent, or Firm* — Donald T. Black (57) ABSTRACT

In a thermochemical regenerator wherein gaseous combustion products that are formed by combustion in a furnace are passed from the furnace into and through a first regenerator, the combustion products are combined with gaseous fuel, and the resulting mixture is passed into and through a second regenerator wherein the mixture undergoes an endothermic reaction to form syngas, the thermochemical regeneration is enhanced by injecting fuel gas into a recycle stream comprising the combustion products from the first regenerator to entrain recycled flue gas that passes out of the first regenerator and to impel the mixture into the other regenerator.

19 Claims, 7 Drawing Sheets

(56) References Cited

U.S. PATENT DOCUMENTS

2015/0210581 A1\* 7/2015 Sorg ................. F28D 17/02
　　　　　　　　　　　　　　　　　　　　　431/221
2016/0305656 A1\* 10/2016 Wu .................... F23C 9/00
2017/0121206 A1　 5/2017 Kobayashi
2018/0118600 A1　 5/2018 Francis, Jr. et al.

OTHER PUBLICATIONS

Wayback Machine Screenshot, Inspection for Industry LLC (Year: 2022).\*
El-Behery (Year: 2017).\*
Praxair, Optimelt™ TCR System (Year: 2016).\*

\* cited by examiner

FLUE GAS RECYCLE METHOD FOR THERMOCHEMICAL REGENERATION

RELATED APPLICATIONS

This application claims the benefit of U.S. Provisional Application Ser. No. 62/746,324, filed on Oct. 16, 2018, which is incorporated herein by reference.

FIELD OF THE INVENTION

The present invention relates to combustion in furnaces such as glassmelting furnaces wherein material is fed into the furnace and is heated and/or melted by the heat of combustion that occurs within the furnace.

BACKGROUND OF THE INVENTION

Technology is generally known in which pairs of regenerators are used in repeated cycles to utilize the heat that is contained in the hot gaseous combustion products (also referred to as flue gas) from a furnace (such as a glassmelting furnace). In one cycle, flue gas is passed through a first regenerator in which the hot flue gas heats structure in the interior of the first regenerator, while another gas stream such as gaseous oxidant is passed through a second regenerator that has already been heated, to heat the gas stream which is then passed into the furnace and thereby cool the second regenerator. Then, in the second cycle, flue gas is passed instead through the second regenerator to heat it, and the gas stream is passed instead through the first regenerator which had become heated in the previous cycle. The two cycles are alternated.

An improved technology that can be practiced using paired regenerators is disclosed in U.S. Pat. No. 6,113,874 which discloses heat recovery methods useful with furnaces employing regenerators. More specifically, a stream of combustion products formed in the furnace is passed through a first regenerator to heat the first regenerator and cool the combustion products, and then a portion of the cooled combustion products is mixed with fuel to form a mixture which is passed through a second heated regenerator in which the mixture undergoes an endothermic reaction to form syngas that then passes into the furnace and is combusted.

The present invention provides the ability to practice these technologies with improved efficiency and economy.

BRIEF SUMMARY OF THE INVENTION

One aspect of the present invention is a method of carrying out combustion in a furnace, comprising (A) combusting fuel in a furnace to produce gaseous combustion products, and (B) alternately (1) passing gaseous combustion products from the furnace into and through a cooled first regenerator to heat the first regenerator and cool said gaseous combustion products, and injecting a stream of gaseous fuel into a recycle stream comprising said gaseous combustion products cooled in said first regenerator, to entrain said recycle stream into said injected stream of gaseous fuel thereby forming a mixture of the gaseous fuel with said entrained gaseous combustion products and to impel the mixture into a heated second regenerator, and, in the second regenerator, reacting the gaseous combustion products and the fuel in said mixture in an endothermic reaction to form syngas comprising hydrogen and CO, and passing said syngas from the second regenerator into the furnace and combusting it in the furnace, and (2) passing gaseous combustion products from the furnace into and through a cooled second regenerator to heat the second regenerator and cool said gaseous combustion products, and injecting a stream of gaseous fuel into a recycle stream comprising said gaseous combustion products cooled in said second regenerator, to entrain said recycle stream into said injected stream of gaseous fuel thereby forming a mixture of the gaseous fuel with said entrained gaseous combustion products and to impel the mixture into a heated first regenerator, and, in the first regenerator, reacting the gaseous combustion products and the fuel in said mixture in an endothermic reaction to form syngas comprising hydrogen and CO, and passing said syngas from the first regenerator into the furnace and combusting it in the furnace.

The recycle flue gas stream into which the stream of gaseous fuel is injected is typically divided from the entire stream of cooled gaseous combustion products that leaves each cooled regenerator in turn, in which case the balance of the cooled gaseous combustion products is passed to exhaust.

In one preferred embodiment of this invention, after each mixture of gaseous fuel with entrained gaseous combustion products is formed, additional gaseous fuel is added to the mixtures before the mixtures are in turn alternately impelled into the heated first and second regenerators.

Another embodiment of the invention employs a device that has first and second chambers that are connected by a passageway, and in step (B)(1) a stream of gaseous fuel is injected into said gaseous combustion products in a first chamber of the device, and the resulting mixture of gaseous fuel and gaseous combustion products is passed from said first chamber through said passageway and through said second chamber into the heated second regenerator; and in step (B)(2) a stream of gaseous fuel is injected into said gaseous combustion products in the second chamber of the device and the resulting mixture of gaseous fuel and gaseous combustion products is passed from said second chamber through said passageway and through said first chamber into the heated first regenerator.

In one preferred variant of this embodiment of the invention, the first chamber is within the first regenerator and the second chamber is within the second regenerator, the first and second regenerators are separated by a wall that is in contact with the first and second regenerators, and the passageway between the first and second chambers passes through the wall. In this variant, no ducts external to the regenerators are needed.

It is preferred to incorporate a purging step into this invention, wherein at the end of step (B)(1) before step (B)(2) is begun, the passage of gaseous fuel into the second regenerator is discontinued, and motive gas is passed into and through the second regenerator to purge gaseous fuel from the second regenerator; and wherein at the end of step (B)(2) before step (B)(1) is begun, the passage of gaseous fuel into the first regenerator is discontinued, and motive gas is passed into and through the first regenerator to purge gaseous fuel from the first regenerator. Preferably, the motive gas is injected into, and entrains, a stream of recycled flue gas to form a mixture which is impelled into the regenerator that is being purged.

DETAILED DESCRIPTION OF THE INVENTION

The present invention employs a heat recovery process which recaptures usable heat from high temperature flue gas exhaust streams. Preferred examples of combustion processes with which the method of this invention can be practiced include glassmelting furnaces, in which glass-forming ingredients are melted together to form molten glass.

This heat recovery process proceeds in two cycles, which are referred to herein as the flue cycle and the reforming cycle. These two cycles are performed alternatingly in two or more checker-filled regenerators. The heat recovery process is preferably carried out in association with furnaces and other combustion devices which employ "oxy-fuel" combustion processes, i.e. combustion of fuel with gaseous oxidant comprising an oxygen content of at least 50 vol. % oxygen, and preferably at least 80 vol. % oxygen, more preferably at least 90 vol. % oxygen, and even at least 99 vol. % oxygen, because the flue gases produced by oxy-fuel combustion have higher H2O and CO2 concentrations, both of which promote the endothermic reforming reactions that are utilized in the method of this invention. During the flue cycle, the checkers in a first regenerator extract and store heat from a high temperature flue gas which is fed from the furnace into and through this regenerator. Then, in the reforming cycle, from the cooled flue gas that exits the first regenerator, a portion (which is referred to herein as Recycled Flue Gas or RFG) is fed into another (second) regenerator and mixed with a stream of fuel (referred to herein as Reforming Fuel or RF). In the following description, pure methane (CH4) is described as reforming fuel for purposes of illustration. Other satisfactory fuels include any combustible gas, gas mixture, or vaporized liquid fuels including, but not limited to, natural gas, propane, and LPG (liquefied petroleum gas).

In the reforming cycle, the RFG/Reforming Fuel mixture enters the second regenerator in which the checker has already been heated, as described herein, and flows through it towards the furnace. The temperature of the RFG/RF mixture passing through the second regenerator continues to increase by extracting heat from the already pre-heated checker. As the RFG/RF mixture passes through the second regenerator, it reaches a temperature at which reforming reactions begin to occur and continue to occur, producing products including H2 and CO. The reforming reactions are endothermic and the heat needed to promote the reforming reactions is absorbed from the heated checker. The gaseous composition that is produced by the reforming reactions typically comprises one or more components such as H2, CO, unreacted gases comprising H2O, CO2, CH4, nitrogen, any residual NOx, and soot. The gaseous composition thus produced may also be called "syngas" herein. The syngas emerges from the second regenerator into the furnace and is combusted in the furnace with oxidant to provide thermal energy for heating and/or melting material in the furnace.

After a length of time, the operation of the two regenerators is reversed, i.e., the regenerator that was used in the flue cycle is switched to the reforming cycle, and the regenerator that was used in the reforming cycle is switched to the flue cycle. After a further period of time, the operation of the two regenerators is reversed again. The timing of the reversals can be determined by elapsed time, or by other criteria such as the temperature of the flue gas exiting from the first regenerator that is in flue cycle. The reversal process is carried out according to a predetermined mechanism and plan, wherein valves are sequenced to open and close and motive gases are turned on and off based on specific timings.

Figure 1:
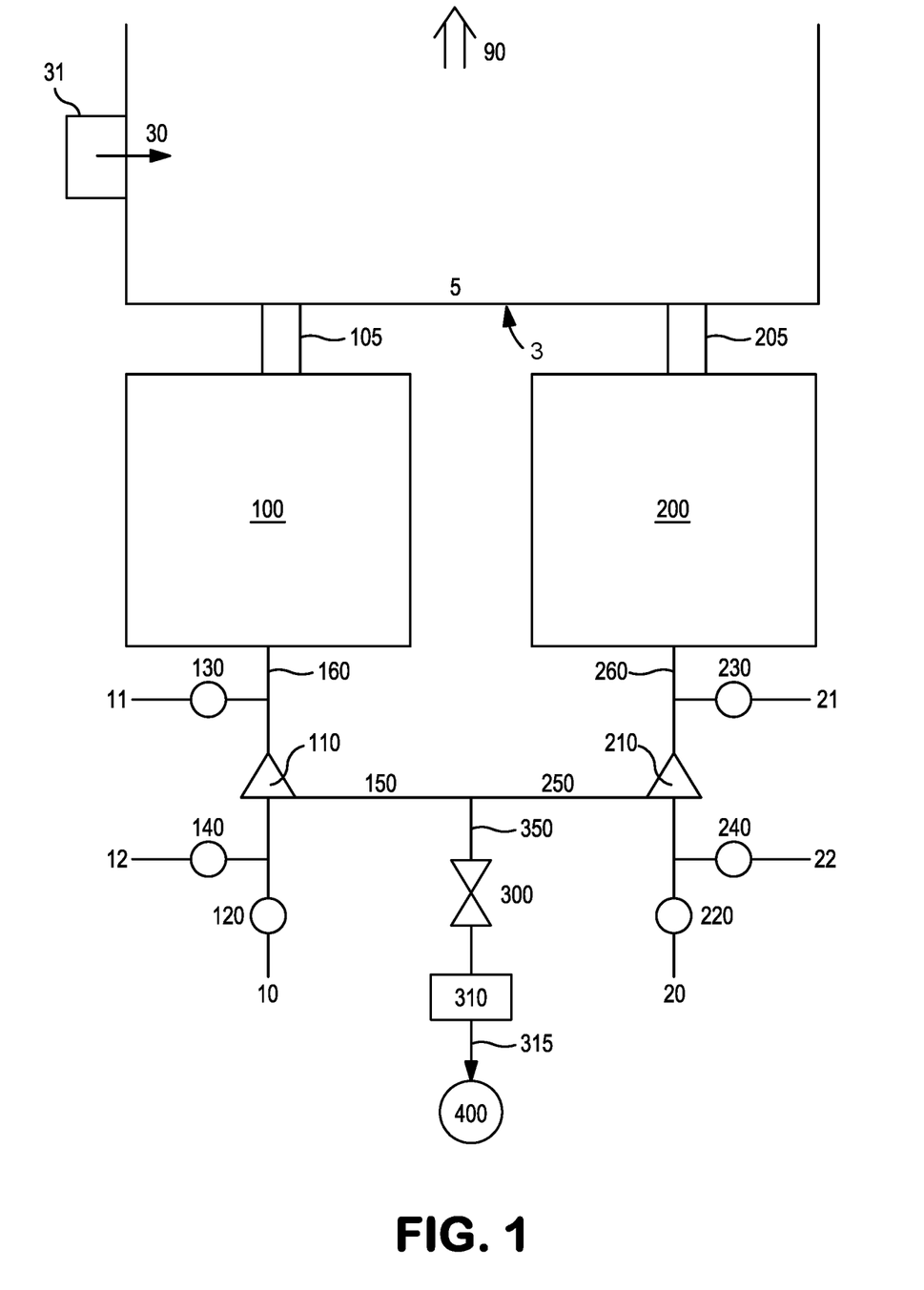
FIG. 1 is a flowsheet of one embodiment of the present invention.

The operation and control of the present invention is described in more detail below in conjunction with FIGS. 1 to 8. Referring first to FIG. 1, an end-port fired glass furnace (5) fitted with two regenerators (100) and (200) in end wall (3) of furnace (5) is used as an example. However, the operation described herein of a pair of regenerators can be carried out in the same manner when the pair of regenerators are side by side on one side of furnace (5) or are positioned on opposite sides of furnace (5).

As shown in FIG. 1, end-port glass furnace (5) has a feed station represented as (31) where feed material (30) comprising solid glassmaking materials (known as batch and/or cullet) are charged into the furnace to be heated and melted. The flow of molten glass out of furnace (5) is represented as (90). The furnace (5) is equipped with first regenerator (100) on the furnace left side and second regenerator (200) on the furnace right side. Vertical cross-sectional views of the two regenerators are displayed in more detail in FIGS. 2 and 3.

Figure 2:
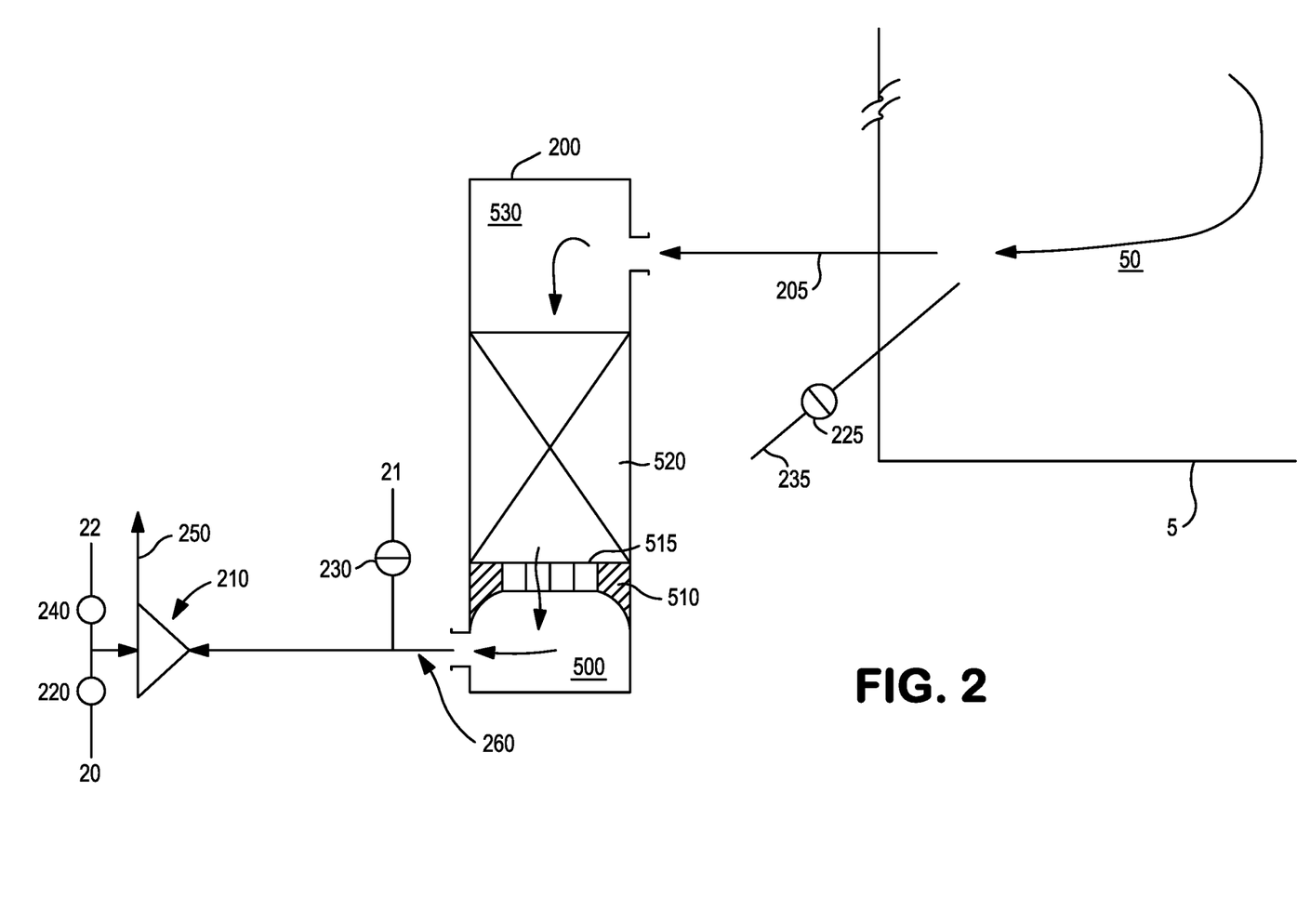
FIG. 2 is a cross-sectional schematic view of a part of the embodiment of FIG. 1.

As seen in FIGS. 1 and 2, the interior of furnace (5) is connected to the top space (530) of regenerator (200) by port neck (205). Checkers (represented as (520)) are provided within regenerator (200) and arranged with passages between the checkers through which gas can flow to and from chamber bottom space (500) through gas passages (515) supported on arch (510) which also supports the weight of the bed of checkers in regenerator (200).

Also as seen in FIGS. 1 and 2, conduit (260) is connected to bottom space (500) and to device (210) which is described in more detail below. Supplemental gaseous fuel feed line (21) is connected to conduit (260) through valve (230). Reforming fuel line (20) is connected to device (210) through valve (220) to be able to pass reforming fuel into device (210) as described herein. Motive gas line (22) is connected to device (210) through valve (240) to be able to pass purge gas into device (210) as described herein. Flue gas line (250) is connected to device (210) to be able to pass gas into device (210) or to receive gas from device (210) as described herein. Flue gas line (250) extends from device (210) to line (350) and to line (150) which is described below. Line (350) passes through valve (300), which adjusts the proportion of gas flowing through lines (250) and (150) relative to the gas flow that passes via line (350) to motive device (310) which is any device capable of drawing gas toward itself through line (350) such as a fan, blower, or eductor. Line (315) is connected to motive device (310) and to exhaust represented by (400), by which is meant that it does not re-enter the furnace but instead is discharged to the atmosphere and/or conveyed to one or more other stations for storage and/or further treatment or any combination of such destinations.

Figure 3:
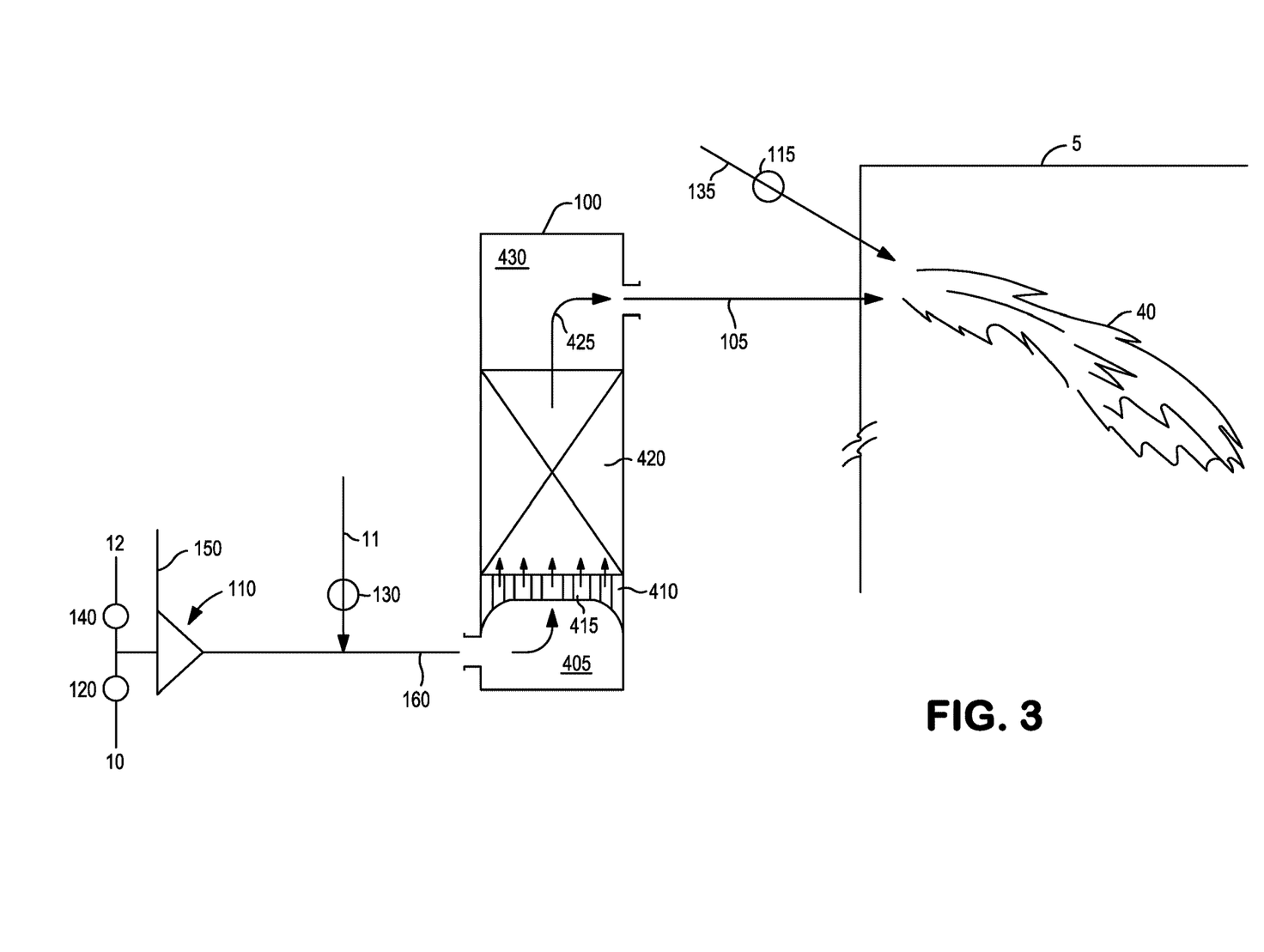
FIG. 3 is a cross-sectional schematic view of another part of the embodiment of FIG. 1.

As seen in FIGS. 1 and 3, the interior of furnace (5) is connected to the top space (430) of regenerator (100) by port neck (105). Checkers (represented as (420)) are provided within regenerator (100) and arranged with passages between the checkers through which gas can flow to and from chamber bottom space (405) through gas passages (415) supported on arch (410) which also supports the weight of the bed of checkers in regenerator (100).

Also as seen in FIGS. 1 and 3, conduit (160) is connected to bottom space (405) and to device (110) which is described in more detail below. Supplemental gaseous fuel feed line (11) is connected to conduit (160) through valve (130). Reforming fuel line (10) is connected to device (110) through valve (120) to be able to pass reforming fuel into device (110) as described herein. Motive gas line (12) is connected to device (110) through valve (140) to be able to pass purge gas into device (210) as described herein. Flue gas line (150) is connected to device (110) to be able to pass gas into device (110) or to receive gas from device (110) as described herein. Flue gas line (150) extends from device (110) to line (150) and to line (350) and to exhaust (400) which are described above.

Figure 4:
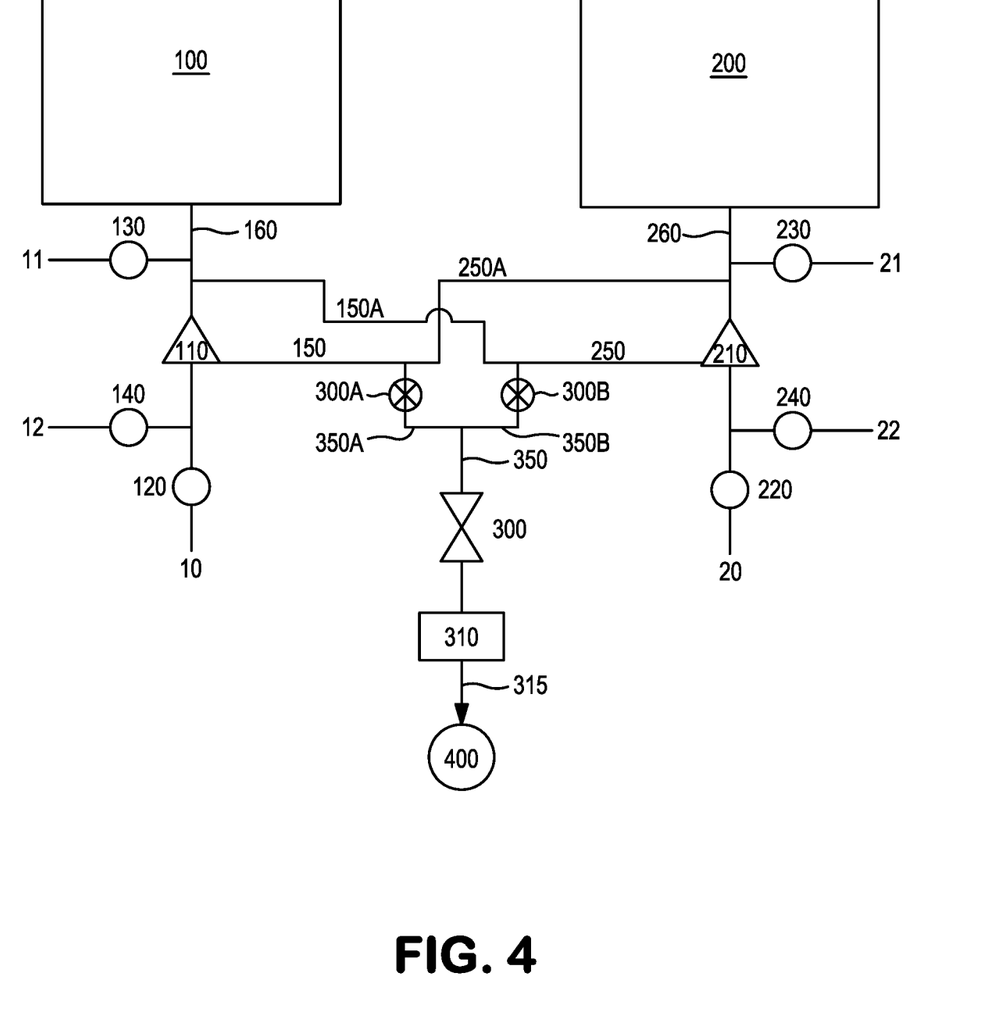
FIG. 4 is a flowsheet of another embodiment of the present invention.

In the embodiment shown in FIG. 4, elements that bear reference numerals which appear in FIG. 1 are the same as described herein with respect to FIG. 1. In addition to these elements, line (150A) is connected to conduit (160) and to line (250) and to line (350B). Line (250A) is connected to conduit (260) and to line (150) and to line (350A). Line (350A) passes through valve (300A) to motive device (310), and line (350B) passes through valve (300B) to motive device (310). Flows of gas through these lines, and the proportions of flows that pass through, and that do not pass through, devices (110) and (210), can be controlled by the size of the lines and by the settings of valve (300) and of motive device (310), and optionally by providing control valves in lines (150A) and (250A). This embodiment may be preferable in some operations, compared to the embodiment of FIG. 1, in that the embodiment of FIG. 1 requires all gaseous combustion products which pass out of regenerator (200) in conduit (260) to either device (110) or to line (350) to pass through device (210), and requires all gaseous combustion products which pass out of regenerator (100) in conduit (160) to either device (210) or to line (350) to pass through device (110), whereas the embodiment of FIG. 4 does not require all such flows of gases to pass through devices (210) and (110) respectively, which provides operational flexibility that operators may find useful.

Figure 5:
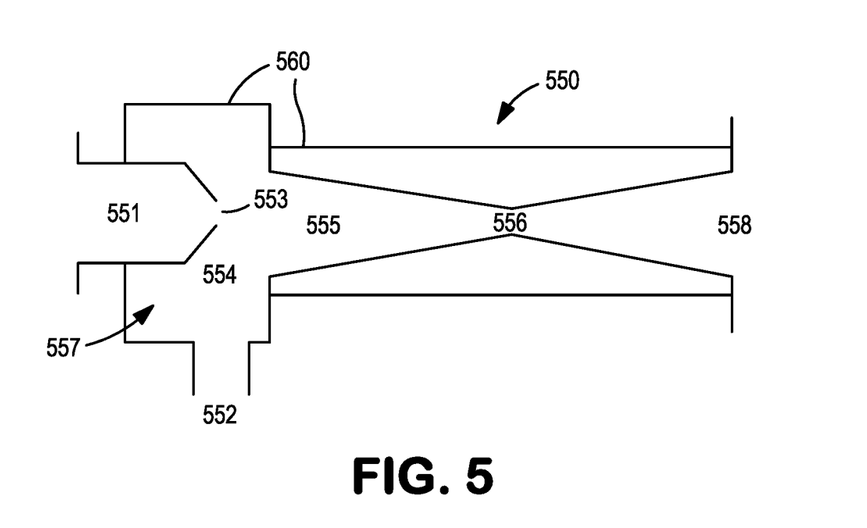
FIG. 5 is a cross-sectional view of a device useful in the practice of the present invention.

FIG. 5 depicts a useful embodiment (550) of a device that can be employed as device (110) and/or device (210) described herein. Device (550) has a solid exterior (560) that is provided with inlet opening (551), second opening (552) and outlet (558) all of which communicate with a hollow interior (557). The hollow interior (557) includes chamber (554) and passageway (555) which communicates with chamber (554). Opening (551) terminates at nozzle opening (553) which faces chamber (554). Passageway (555) can be essentially cylindrical but preferably includes a converging/diverging configuration which appears as (556) in FIG. 5. That is, the diameter of passageway (555) decreases with distance from chamber (554) from where it meets chamber (554) to a point (or segment) at which the diameter is at its smallest and then from that point increases with increasing distance from chamber (554). This converging/diverging shape enhances the entrainment of the gaseous combustion products in the converging section and helps to recover static pressure in the diverging section. Devices of the type described herein useful as devices (110) and (210) include devices known as eductors, which use the kinetic energy of a moving fluid (such as the stream that emerges from nozzle (553)) to entrain another fluid. In operation, when a device (550) is to be employed as device (210) as described herein, conduit (260) is connected to opening (552) and line (20) is connected to opening (551) and line (250) is connected to opening (558). Likewise, when a device (550) is to be employed as device (110) as described herein, conduit (160) is connected to opening (552) and line (10) is connected to opening (551) and line (150) is connected to opening (558). When two different motive gases such as fuel and the motive gas to produce purge gas stream are connected to an eductor either a single nozzle, such as nozzle (553), or two separate nozzles (not shown) with two separate connecting lines and openings (not shown) are employed. A preferred two-nozzle configuration is concentric nozzles consisting of a central nozzle connected to the first motive gas and an annular nozzle around the central nozzle connected to the second motive gas.

Figure 6:
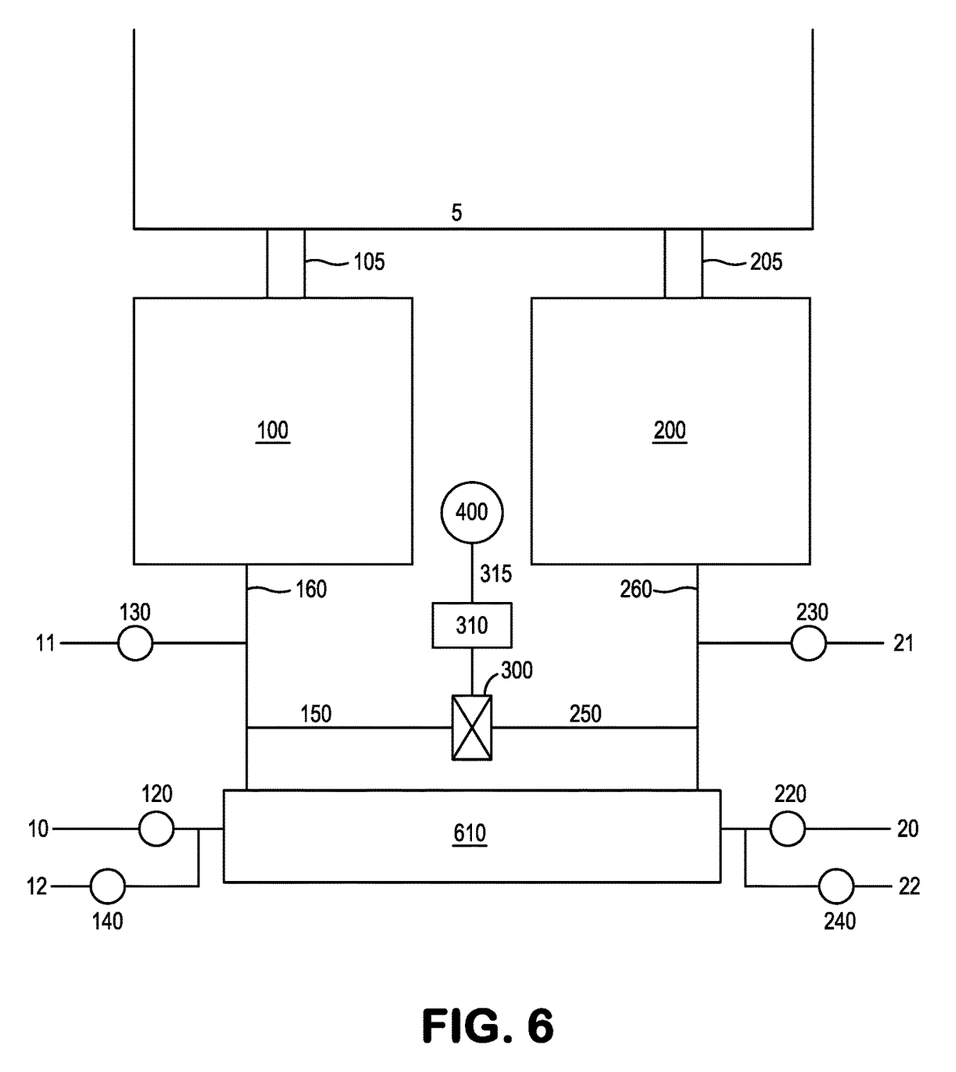
FIG. 6 is a flowsheet of another embodiment of the present invention
Figure 7:
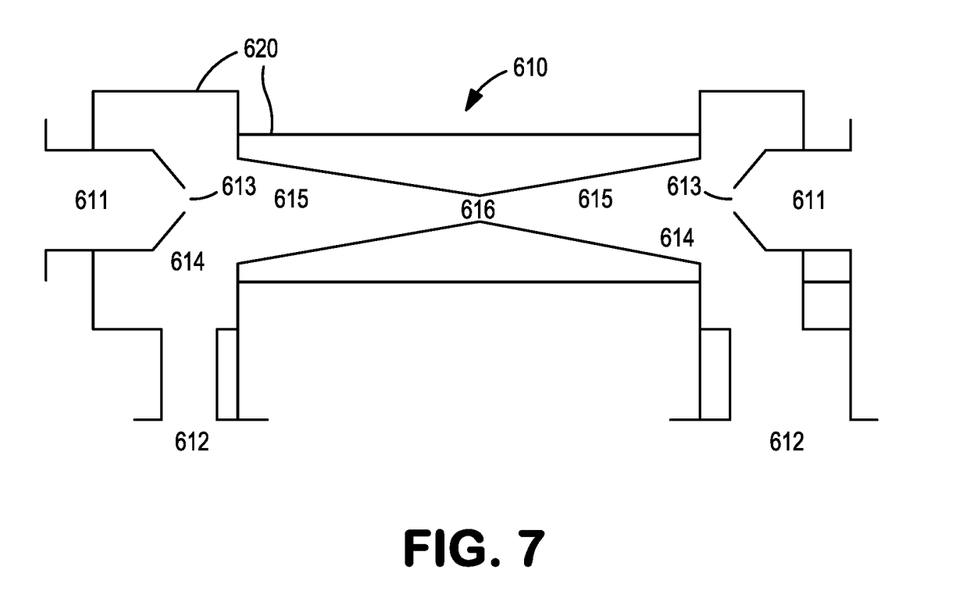
FIG. 7 is a cross-sectional view of a device useful in the practice of the present invention.

FIGS. 6 and 7 depict another alternative embodiment of equipment that is useful in the present invention. In the embodiment shown in FIG. 6, elements that bear reference numerals which appear in FIG. 1 are the same as described herein with respect to FIG. 1. In addition to these elements, device (610) is provided in place of device (110), device (210), and lines (150) and (250). Valve (300) provides control of the proportion of gas flowing in conduits (160) and (260) that passes to exhaust (400) instead of passing into device (610), in the same manner that valve (300) controls the flows into line (350) as described above with respect to FIG. 1.

Referring now to FIG. 7, device (610) is in effect a pair of devices of the type described herein as (550) with respect to FIG. 5, connected end to end at their respective openings (558). That is, device (610) has a solid exterior (620) that is provided with two inlet openings (611) and two second openings (612) all of which communicate with a hollow interior. The hollow interior includes two chambers (614) and a passageway (615) which is connected to both of the chambers (614). The openings (611) terminate at nozzle openings (613) each of which opens into one of the chambers (614). Passageway (615) can be essentially cylindrical but preferably includes a converging/diverging configuration which appears as (616) in FIG. 7. That is, the diameter of passageway (615) decreases with distance from a chamber (614) from where passageway (615) meets the chamber (614) to a point (or segment) at which the diameter is at its smallest and then from that point increases with decreasing distance from the other chamber (614). This converging/diverging shape enhances the entrainment of the gaseous combustion products in the converging section and helps to recover static pressure in the diverging section. Preferably, the passageway in this embodiment is "geometrically symmetrical", by which is meant that the distances from each chamber to the point or segment of smallest diameter are the same, and the rate of change of the diameter relative to distance from each chamber, for each passageway between a chamber (614) and the point or segment of smallest diameter is the same. In operation, conduit (260) is connected to one of the openings (612) and line (20) is connected to one of the openings (611); and conduit (160) is connected to the other of the openings (612) and line (10) is connected to the other of the openings (611).

Figure 8:
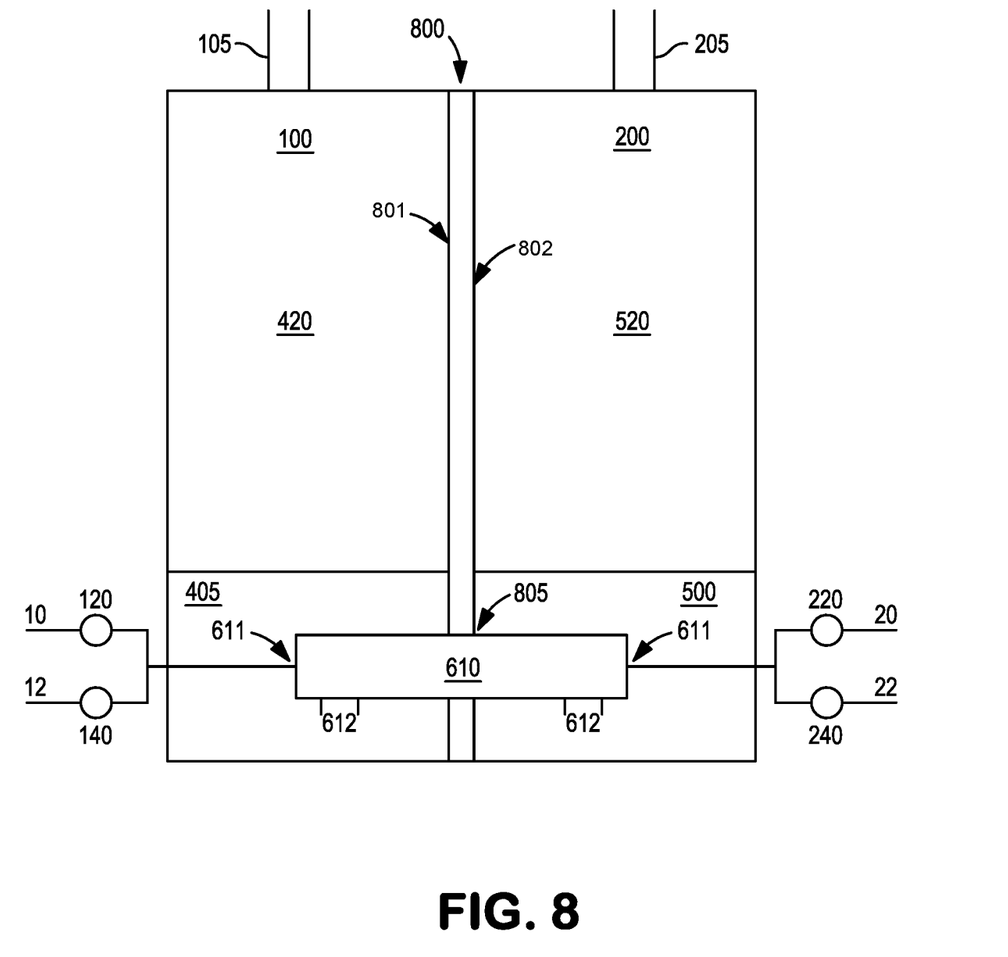
FIG. 8 is a cross-sectional view of regenerator equipment embodying yet another embodiment of the invention

FIG. 8 depicts another alternative arrangement of equipment with which the present invention can be performed. This embodiment is advantageously employed when the regenerators (100) and (200) are separated by a common wall (800) which is in contact with both of the regenerators (100) and (200). Such a common wall can be a single solid structure constructed of refractory bricks or other heat-resistant material, or it can be comprised of two such solid structures which enclose a space between them. One surface (801) of wall (800) is in contact with the space that contains checkers (420) and another surface (802) of wall (800) is in contact with the space that contains checkers (520). In the embodiment shown in FIG. 8, device (610) is positioned in opening (805) that extends through wall (800), so that one of the aforementioned openings (612) is within regenerator (100) and another opening (612) is within regenerator (200). More specifically, an opening (612) is in bottom space (500), and another opening (612) is within bottom space (405). Preferably the opening (612) is positioned in device (610) facing downward toward the bottom floor of regenerators so as to prevent dust and debris from the checkers above falling into the opening. Also, there is an opening (611) of device (610) within regenerator (100) and an opening (611) within regenerator (200). In this embodiment, no ductwork is needed between the openings (612) and the interior of the regenerators, as the devices (610) are already within the regenerators.

The method of the present invention can be carried out in the following manner.

Referring first to FIGS. 1, 2 and 3, in one cycle of operation regenerator (200) is in the flue cycle wherein gaseous combustion products ("flue gas") from the interior of furnace (5) enters port neck (205) and then flows into the top space (530) of regenerator (200). This flue gas stream heats checkers (520) as it flows through passages between the checkers within regenerator (200), and enters chamber bottom space (500) through gas passages (515) in the bed of checkers.

As seen in FIGS. 1 and 2, the cooled flue gas stream exits regenerator (200) in conduit (260). In this cycle, valves (230), (220) and (240) are closed. In this embodiment of the invention, the cooled flue gas passes through device (210) into line (250). The majority of the flue gas in line (250) passes through valve (300) into exhaust (400) as exhaust as defined herein. A portion of the flue gas from line (250), preferably between 5 to 30% of the flue gas, passes into line (150) and then enters into device (110) through opening (552) (FIG. 5). This is recycled flue gas (RFG). The balance of the flue gas is preferably passed to exhaust.

Reforming fuel (RF) is supplied by line (10) through valve (120), which is open, into device (110) through opening (551) and nozzle (553). Valve (140) should be closed during this portion of the cycle.

Feeding the reforming fuel through nozzle (553) entrains the flue gas that has entered device (110) into the stream of fuel gas. This entrainment forms a mixture of flue gas and reforming fuel in chamber (554). Entrainment is preferably accomplished by injecting the fuel gas at a high pressure and velocity, and preferably in a direction that permits the stream of injected flue gas to intersect with the incoming stream of flue gas. Preferably, the mass flow ratio of the entrained recycle flue gas to the injected gaseous fuel is 0.5:1 to 30:1 and more preferably 0.5:1 to 20:1. The injected fuel gas should pass out of the nozzle (553) at high velocity created by a high gas supply pressure, preferably of 5 psig to 200 psig, more preferably of 5 psig to 100 psig, to entrain the flue gas into the injected fuel gas, to create a mixture of the injected fuel gas with the flue gas, and to impel the created mixture into the regenerator (100).

As seen with reference to FIGS. 1 and 3, the mixture of reforming fuel and flue gas exits device (110) in conduit (160) and passes into the bottom space (405) of regenerator (100). If desired, additional reforming fuel is fed into the mixture of reforming fuel and flue gas that has passed out of device (110). This additional reforming fuel can be provided through line (11) through open valve (130). Preferably the mass flow rate of this additional reforming fuel is greater than the mass flow rate of the gaseous fuel that is injected into and entrains the recycled flue gas. Adding this additional gaseous reforming fuel can help establish that the mixture of fuel and flue gas that enters a regenerator conforms to a desired ratio of recycled flue gas to reforming fuel (RFG/RF) to within a desired range, which is typically 0.5:1 to 3:1, by volume.

The mixture of reforming fuel and flue gas (with or without additional fuel fed via line (11) into the mixture that passed out of device (110)) enters the already pre-heated checker pack (420) of regenerator (100) through gas passages (415). Regenerator (100) has already been heated in a previous cycle by passage of flue gas from the furnace into and through the regenerator (100). The temperature of the RFG/RF mixture increases as it flows through the checker pack of regenerator (100). When the temperature of the RFG/RF reaches reforming temperature, endothermic reforming reactions occur in which the reforming fuel (e.g. $CH_4$) reacts with $CO_2$ and $H_2O$ in the RFG and forms CO, $H_2$, and some soot. The required heat for the endothermic reforming reactions is taken from the heated checkers. The reforming reaction continues as the RFG/RF mixture continues to travel toward the top space (430). The gaseous stream (425) (referred to herein as a "reformed" or "syngas" gas stream) exits from the top of checker pack (420). Stream (425) has high temperature and includes species such as CO, $H_2$, soot, unreacted $CH_4$, and unreacted $CO_2$ and $H_2O$. The syngas stream (425) passes through port neck (105) and enters furnace (5). The syngas stream exits checker pack (420) at temperatures for example ranging from 1800 F to 2500 F. This syngas is combusted in the furnace (5) represented as flame (40) to generate additional heat of combustion useful for heating and/or melting material in the furnace, such as glassmaking materials. Oxidant required for combustion of the syngas is supplied by a conduit (135) through opened valve (115). This oxidant can be air, or it can have an oxygen content higher than that of air, i.e. at least 21 vol. %, and preferably equal to or higher than 80 vol. %, more preferably equal to or higher than 90 vol. %, or even at least 99 vol. %.

Typically, the method of the present invention proceeds with one regenerator in the flue cycle and one regenerator in the reforming cycle, for about 20 to 40 minutes or until the checkers in the reforming regenerator are too cold to provide sufficient heat to promote the desired endothermic chemical reactions. At that point, and now continuing with the description herein where regenerator (200) was in the flue cycle and regenerator (100) was in the reforming cycle, furnace (5) undergoes reversal in which regenerator (200) is transitioned to the reforming cycle for heat recovery and regenerator (100) is transitioned into the flue cycle for heat accumulation.

Before the reversal, remaining syngas in regenerator (100) should be purged to furnace (5). In this instance, reforming fuel supplied to the regenerator is terminated at first by closing valves (120) and (130) while letting the flow of RFG from device (110) continue. During purging, the RFG flow rate may be increased to shorten the time required for purging to be completed. Remaining syngas in regenerator (100) is purged by the RFG for a specified amount of time so that nearly all the syngas in the regenerator is expelled to the furnace and combusted to completion. Purging can be carried out by feeding motive gas from line (12) by opening valve (140). Motive gas should not contain combustible fuel. Suitable purging gas can include any of flue gas (preferably, clean compressed flue gas that has passed out of one of the regenerators), steam, air, carbon dioxide, and/or other gases, or mixtures thereof, provided that the oxygen content of the purging gas is less than 25 vol. %, more preferably less than 15 vol. %, and even more preferably less than 2 vol. %. The oxygen concentration of the mixture of motive gas and entrained gaseous combustion products that is formed in carrying out the purging step should be less than 10%, preferably less than 6%, more preferably less than 4%, and even more preferably less than 2%, by volume on a wet basis. The purging gas is preferably fed at a pressure of 1 psig to 1000 psig, preferably 5 psig to 150 psig. The mass entrainment ratio of motive gas (that is, the ratio of the mass flow rate of entrained flue gas to the mass flow rate of the motive gas) should be 1 to 30 or 1 to 20, preferably 5 to 30 or 5 to 20, and more preferably 10 to 30.

Upon reversal, flue gas from the furnace passes through regenerator (100) instead of through regenerator (200), and a portion of the flue gas passes to exhaust (as defined herein) while a portion or the balance is entrained in device (210) with gaseous fuel to form a mixture of flue gas and reforming fuel which is impelled into regenerator (200) (with or without additional reforming fuel which, if desired, is fed by line (21) through valve (230). To carry out this cycle, valve (240) which had been closed is opened, and valves (120) and (130) which had been open are closed. The mixture of reforming fuel and recycled flue gas undergoes in regenerator (200) the endothermic reactions which had occurred in regenerator (100) in the previous cycle as described herein, to produce syngas (425) which passes into furnace (5) where it is combusted with oxidant (235) that is fed through valve (225).

To perform the method of the present invention with the arrangement that appears in FIG. 4, the operation is performed as described above with reference to FIGS. 1, 2 and 3, with the additional feature that valves (300A) and (300B) can be fully or partially opened, or closed, as desired to adjust how much gas passes through the devices (110) and (210) during each cycle of the operation. As mentioned above, gas flows can also be controlled by appropriate settings of valve (300) and motive device (310).

To perform the method of the present invention with the arrangements that appear in FIG. 6 or FIG. 8, the operation is as described above with reference to FIGS. 1, 2 and 3. The device (610) is advantageous in that all of the gas that flows out of one chamber (614) enters the other chamber (614), thereby simplifying operation and requiring fewer lines and valves.

What is claimed is:

1. A method of carrying out combustion in a furnace, comprising
   (A) combusting fuel in a furnace to produce gaseous combustion products, and
   (B) alternately
(1) passing gaseous combustion products from the furnace into and through a cooled first regenerator to heat the first regenerator and cool said gaseous combustion products, and injecting a stream of gaseous fuel into a recycle stream comprising said gaseous combustion products cooled in said first regenerator, to entrain said recycle stream into said injected stream of gaseous fuel thereby forming a mixture of the gaseous fuel with said entrained gaseous combustion products and to impel the mixture into a heated second regenerator, ad feeing additional gaseous fuel into the mixture of gaseous fuel with entrained gaseous combustion products before the mixture is impelled into the heated second regenerator and, in the second regenerator, reacting the gaseous combustion products and the fuel in said mixture in an endothermic reaction to form syngas comprising hydrogen and CO, and passing said syngas from the second regenerator into the furnace and combusting it in the furnace, and (2) passing gaseous combustion products from the furnace into and through a cooled second regenerator to heat the second regenerator and cool said gaseous combustion products, and injecting a stream of gaseous fuel into a recycle stream comprising said gaseous combustion products cooled in said second regenerator, to entrain said recycle stream into said injected stream of gaseous fuel thereby forming a mixture of the gaseous fuel with said entrained gaseous combustion products and to impel the mixture into a heated first regenerator, and feeding additional gaseous fuel into the mixture of gaseous fuel with entrained gaseous combustion products before the mixture is impelled into the heated first generator and, in the first regenerator, reacting the gaseous combustion products and the fuel in said mixture in an endothermic reaction to form syngas comprising hydrogen and CO, and passing said syngas from the first regenerator into the furnace and combusting it in the furnace.

2. A method according to claim 1 where in step (B)(1) said stream of gaseous fuel is injected into said gaseous combustion products in a first chamber of a device that has first and second chambers that are connected by a passageway, and said mixture of gaseous fuel and gaseous combustion products is passed from said first chamber through said passageway and through said second chamber into the heated second regenerator; and wherein in step (B)(2) said stream of gaseous fuel is injected into said gaseous combustion products in said second chamber of said device and said mixture of gaseous fuel and gaseous combustion products is passed from said second chamber through said passageway and through said first chamber into the heated first regenerator.

3. A method according to claim 2 wherein the first chamber is within the first regenerator and the second chamber is within the second regenerator, the first and second regenerators are separated by a wall that is in contact with regenerators, and the passageway between the first and second chambers passes through the wall.

4. A method according to claim 2 wherein said passageway has a converging-diverging section in the passageway.

5. A method according to claim 4 wherein said converging-diverging section is geometrically symmetrical.

6. A method according to claim 1 wherein at the end of step (B)(1) before step (B)(2) is begun, the passage of gaseous fuel into the second regenerator is discontinued, and then a stream of motive gas which does not contain gaseous fuel is injected into a recycle stream comprising said gaseous combustion products cooled in said first regenerator, to entrain said recycle stream into said injected stream of motive gas thereby forming, a mixture of the motive gas with said entrained gaseous combustion products and to impel the mixture into a heated second regenerator, to purge gaseous fuel from the second regenerator; and wherein at the end of step (B)(2) before step (B)(1) is begun, the passage of gaseous fuel into the first regenerator is discontinued, and then a stream of motive gas which does not contain gaseous fuel is injected into a recycle stream comprising said gaseous combustion products cooled in said second regenerator, to entrain said recycle stream into said injected stream of motive gas thereby forming a mixture of the motive gas with said entrained gaseous combustion products and to impel the mixture into a heated first regenerator, to purge gaseous fuel from the first regenerator.

7. A method according to claim 6 wherein said motive gas is selected from the group consisting of steam, air, recycled cooled flue gas, and mixtures thereof.

8. A method according to claim 6 wherein the ratio of the mass flow rate of said entrained recycle stream to the mass flow rate of said stream of motive gas is between 1 to 30.

9. A method according to claim 6 wherein the ratio of the mass flow rate of said entrained recycle stream to the mass flow rate of said stream of motive gas is between 1 to 20.

10. A method according to claim 6 wherein the ratio of the mass flow rate of said entrained recycle stream to the mass flow rate of said stream of motive gas is between 5 to 30.

11. A method according to claim 6 wherein the ratio of the mass flow rate of said entrained recycle stream to the mass flow rate of said stream of motive gas is between 5 to 20.

12. A method according to claim 6 wherein the ratio of the mass flow rate of said entrained recycle stream to the mass flow rate of said stream of motive gas is between 10 to 30.

13. A method according to claim 6 wherein the oxygen concentration in said mixture of the motive gas with said entrained gaseous combustion products is less than 10% volume on a wet basis.

14. A method according to claim 6 wherein the oxygen concentration in said mixture of the motive gas with said entrained gaseous combustion products is less than 6% volume on a wet basis.

15. A method according to claim 6 wherein the oxygen concentration in said mixture of the motive gas with said entrained gaseous combustion products is less than 4% volume on a wet basis.

16. A method according to claim 6 wherein the oxygen concentration in said mixture of the motive gas with said entrained gaseous combustion products is less than 2% volume on a wet basis.

17. A method according to claim 1 wherein the mass flow ratio of said entrained recycle stream to said gaseous fuel is between 0.5 to 30.

18. A method according to claim 1 wherein the mass flow ratio of said entrained recycle stream to said gaseous fuel is between 0.5 to 20.

19. A method according to claim 1 wherein the mass flow rate of said additional fuel is greater than the mass flow rate of said gaseous fuel.

\* \* \* \* \*